Jan. 30, 1962 W. H. REINHOLTZ 3,019,420

MATRIX MEMORY

Filed Oct. 8, 1956 2 Sheets-Sheet 1

INVENTOR:
William H. Reinholtz

By Ellsworth R. Roston
Attorney

Jan. 30, 1962 W. H. REINHOLTZ 3,019,420

MATRIX MEMORY

Filed Oct. 8, 1956 2 Sheets-Sheet 2

INVENTOR:
William H. Reinholtz

By Ellsworth R. Roston
Attorney 3,019,420

MATRIX MEMORY

William H. Reinholtz, La Crescenta, Calif., assignor to General Precision, Inc., a corporation of Delaware Filed Oct. 8, 1956, Ser. No. 614,554
4 Claims. (Cl. 340—174.1)

Figure 3:
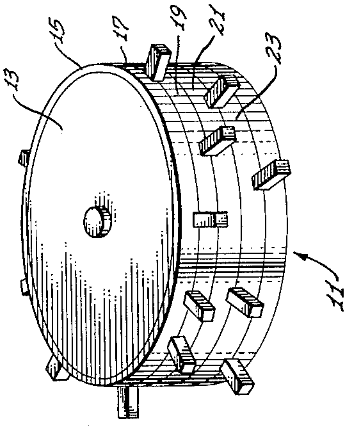

This invention relates to a memory matrix and more particularly to apparatus for use with a plurality of transducers for controlling which one of the transducers in the plurality is to be activated at any instant. The invention also relates to apparatus for controlling the operation of the selected transducer either as a member for reading previously recorded information or as a member for recording new information.

A considerable number of digital computers and data processing systems have been built in recent years to perform a wide variety of different operations. The digital computers operate to solve mathematical problems which have been able to be solved previously only after considerable mental effort over long periods of time. Data processing systems have been built to control commercial operations such as in banks and department stores and to control industrial operations such as complex manufacturing procedures.

The digital computers and data processing systems now in use store large quantities of different bits of information. The computers and data processing systems store the information in such storage means as a rotatable magnetic drum. These bits of information are sequentially presented by the drum for computations which are under the control of coders provided in the computers and data processing systems. As the information is presented, computations are are performed in accordance with the codes and new bits of information resulting from such computations are recorded in the computer. In this way, information is constantly being read and is thereafter recorded for subsequent reading by the computers.

Transducers are used to read and record the different bits of information in the digital computers and data processing systems. In many types of computers and data processing systems, the same transducers are used at particular times to read the different bits of information and are used at other times to record the bits of information produced by the computer. Since a large number in the order of thousands and hundreds of thousands of bits of information are often stored in digital computers and data processing systems, a plurality of transducers are often use. The number of transducers used in many instances may be in the tens and even in the hundreds. These transducers may be disposed in contiguous relationship to the different channels which store the magnetic bits of information.

Problems have arisen in the digital computers and data processing systems now in use as to the activiation of particular transducers at any instant. For example, at one instant it may be desired that one transducer be activated and at the next instant it may be desired that a different transducer be activated. The problems have arisen because it has been difficult to activate different transducers at successive instants of time. The problem has been further aggravated because at certain times a transducer has to be activated to read information and at the next instant that transducer or a different transducer has to be activated to record information.

This invention provides a system which overcomes the above difficulties. The invention includes a plurality of transducers such as magnetic heads which are disposed in contiguous relationship to a drum to read or record magnetic information on the drum. The transducers are connected in first and second groups. The first group of transducers are in turn electrically interrelated with the second groups of transducers to form an individual type of matrix for transducers. Because of the particular interrelationship between the transducers in the first and second groups, only one transducer becomes activated at any instant of time. This is the transducer which is common to the first and second groups receiving the activating signals.

The transducers are connected in a particular matrix arrangement which requires only a minimum number of components for proper activation of any particular one of the transducers in the plurality. Circuitry is also included for insuring the proper operation of the activated transducer regardless of whether the transducer is activated to read information or to record information. This circuitry also includes stages for preventing the activated transducer from disabling the other transducers for proper operation at some time after the activation of the particular transducer. The circuitry also includes components for preventing the introduction of spurious signals to the transducers when other transducers are being activated. In this way, the switching between different transducers can be accomplished in a minimum amount of time and without any problem as to the proper operation of the various transducers at the time that they become activated.

The first groups of transducers may be considered as being disposed in horizontal rows as shown in the drawings. Similarly, the second groups of transducers may be considered as being disposed in vertical rows as shown in the drawings. Each of the transducers is provided with a center tap and with two end terminals. The center taps of the transducers in the first group are connected to different logical networks to control the introduction of signals to the center taps of the transducers for preparing the transducers in the associated group for activation in accordance with the operation of the logical networks. In this way, the transducers in only one of the first groups can be prepared by the logical networks for activation at any one time.

Similarly, the end terminals in the transducers comprising the second groups are connected to logical networks which perform two simultaneous operations. In one of the simultaneous operations, the transducers in one of the second groups are selected for activation in contrast to the transducers in the other ones of the second groups. In the second one of the simultaneous operations, one of the two end terminals in the selected one of the second groups is chosen.

In this way, only one transducer is selected; this transducer being common to the transducers in the selected one of the first groups and to the transducers in the selected one of the second groups. Furthermore, only one-half of that transducer may become energized in accordance with the selection of one or the other of end terminals in the selected transducer. Upon an energizing of a first half of a transducer, a recording of a binary indication of "1" is obtained. A recording of a binary indication of "0" is obtained when the other half of the transducer is energized.

The selected transducer is adapted to read or record information in accordance with the operation of a particular member such as a flip-flop. The flip-flop has one state of operation when information is to be read by the selected transducer, and the flip-flop has an opposite state of operation when information is to be recorded by the selected transducer. When the flip-flop is in the state of operation to produce the recording of information, it operates directly on the logical networks controlling the energizing of the transducers in the second groups to obtain the recording of the information. At the same time that the logical networks become activated to select a particular one of the second groups of transducers, certain stages controlling the reading of information become disabled. When the flip-flop is in the state of operation to produce a reading of information, the circuits controlling the reading of information become activated so that the information can actually be read. Upon the activation of the circuits for reading the information the logical networks become controlled to prevent any information from being recorded at the same time.

Figure 1:
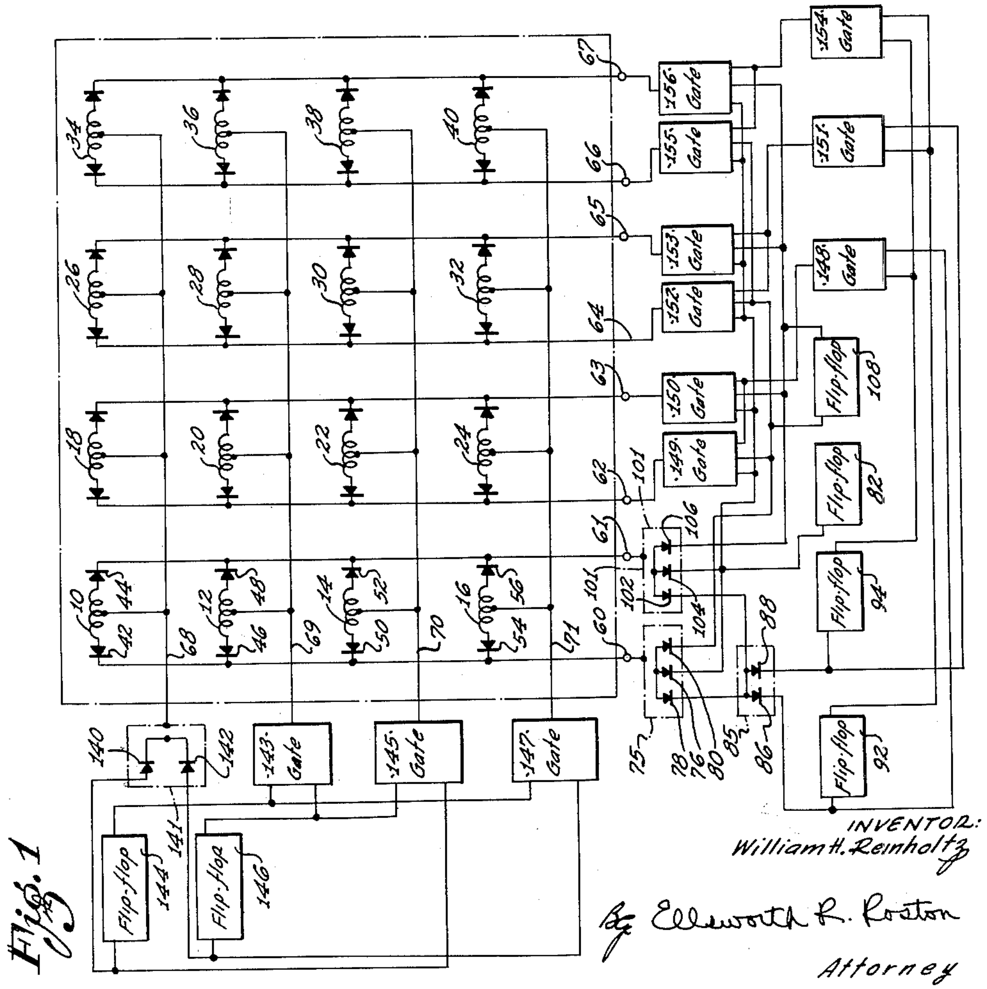

In the drawings:

FIGURE 1 is a circuit diagram somewhat schematically illustrating on a fragmentary basis a matrix network for a plurality of transducers, this matrix network being formed in a particular arrangement constituting one embodiment of the invention.

Figure 2:
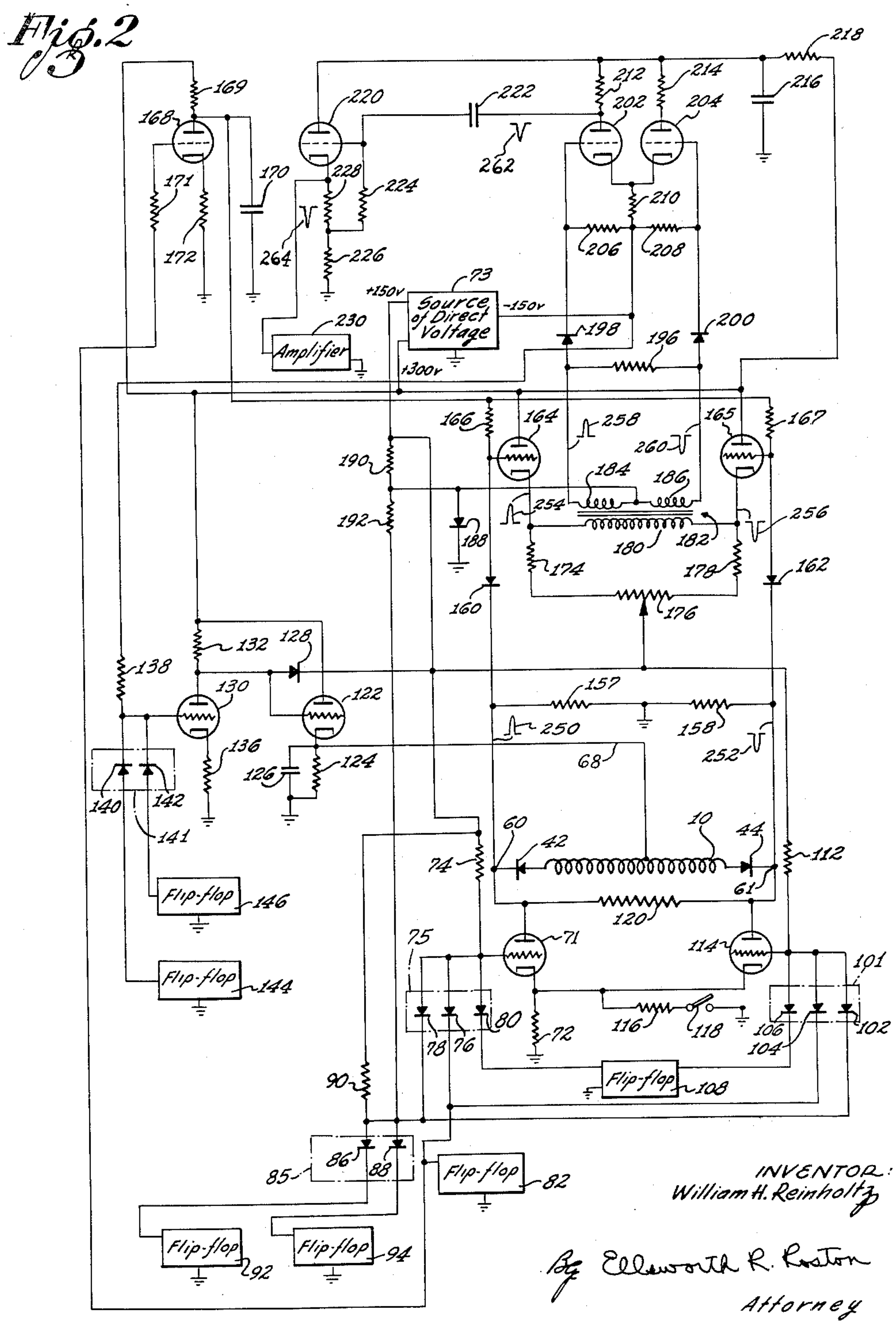

FIGURE 2 is a circuit diagram illustrating the particular circuits controlling the activation of one of the transducers in the matrix network shown in FIGURE 1 and further controlling the activation of the transducer either to read or record information; and, FIGURE 3 is a perspective view somewhat schematically illustrating a few of the transducers shown in FIGURE 1 in relationship to a storage member such as a magnetic drum.

In the embodiment of the invention shown in the drawings, different transducers in a plurality are selectively activated to read or record information in accordance with the operation of particular electrical circuits. Various types of transducers may be used. For purposes of illustration, the transducers are shown in FIGURES 1 and 3 as being magnetic heads. These heads may be disposed in contiguous relationship to a memory member such as a magnetic drum generally indicated at 11 in FIGURE 3. The heads may be disposed to read magnetic information stored in different positions of the drum or to record new information in these positions. The magnetic drum 11 may be formed from a non-magnetic cylinder 13 having a thin coating of a magnetic material 15. The magnetic material 15 may be formed from a suitable material such as a ferrite such that bits of information, can be retained by the material 15 in magnetic form at successive positions along the periphery of the drum.

The combination of a magnetic drum and a plurality of heads in contiguous relationship to the drum has been used in a considerable number of different digital computers and data processing systems. The various heads may be disposed in contiguous relationship to one or more different channels in the drum. Each channel may be considered as a separate peripheral loop at a different axial position on the drum. For example, channels 17, 19, 21 and 23 are shown as being included in the drum 11 in FIGURE 3. By way of illustration, it is possible that all of the heads could be disposed in contiguous relationship to one of the channels or each head could be magnetically coupled to a different channel in the drum. In FIGURE 3, the different heads are disposed in contiguous relationship to a plurality of channels in the drum.

For purposes of illustration, sixteen transducers such as magnetic heads are connected in a matrix arrangement as shown in FIGURE 1. These magnetic members are illustrated at 10, 12, 14, 16, 18, 20, 22, 24, 26, 28, 30, 32, 34, 36, 38 and 40 in FIGURE 1. The matrix arrangement is shown as comprising four heads connected in each of first groups (horizontal in FIGURE 1) and four heads connected in each of second groups (vertical in FIGURE 1). Actually, the matrix arrangement may be different from a 4 x 4 relationship and may not even be symmetrical. For example, six heads could be included in each horizontal group in FIGURE 1 and ten heads could be included in each vertical group in that figure. Each of the heads has a center-tapped winding which is magnetically coupled to the drum 11. Each of the heads is illustrated as a center-tapped winding in FIGURE 1.

The opposite terminals of each magnetic head are connected to the plates of a pair of unidirectional members such as diodes. For example, the heads 10, 12, 14 and 16 are respectively connected to the plates of diodes 42 and 44, diodes 46 and 48, diodes 50 and 52 and diodes 54 and 56. The cathodes of the diodes 42, 46, 50 and 54 have a common connection with a terminal indicated schematically at 60 in FIGURE 1. The terminal 60 forms the output terminal of an amplifier stage which is shown in detail in FIGURE 2. In like manner, connections are made to a terminal indicated at 61 in FIGURE 1 from the cathodes of the diodes 44, 48, 52 and 56. The terminal 61 forms the output terminal of a second amplifier which is shown in detail in FIGURE 2.

The heads 18, 20, 22 and 24 are electrically coupled to output terminals 62 and 63 through a plurality of diodes in a relationship similar to that described above for the heads 10, 12, 14 and 16. The heads 26, 28, 30 and 32 and the heads 34, 36, 38 and 40 are also respectively coupled through pluralities of diodes to output terminals 64 and 65 and output terminals 66 and 67 in relationships corresponding to that described above for the diodes 10, 12, 14 and 16.

Connections are made from a line 68 to the center taps of the heads 10, 18, 26 and 34. In like manner, center taps of the heads 12, 20, 28 and 36, center taps of the heads 14, 22, 30 and 38 and center taps of the heads 16, 24, 32 and 40 respectively have common connections with lines 69, 70 and 71. Only one of the lines 68, 69, 70 and 71 can be energized at any particular instant in accordance with the operation of logical networks which will be described in detail subsequently.

The electrical circuits for controlling the operation of one of the heads such as the head 10 are shown in detail in FIGURE 2. The circuits include the head 10, the diodes 42 and 44 and the terminals 60 and 61. The terminal 60 has a common connection with the plate of a tube 71, which may be included in an envelope designated as a type "5687." The cathode of the tube 71 is connected to one terminal of a resistance 72 having its other terminal grounded. The resistance 72 may have a suitable value such as approximately 10,000 ohms.

The grid of the tube 71 is connected to a logical network including a gate 75 (see also FIG. 1) comprising a plurality of unidirectional members such as diodes 76, 78 and 80. A suitable positive voltage such as approximately 150 volts is applied from a source 73 of direct voltage through a resistance 74 to the grid of the tube 71, the resistance having a suitable value such as approximately 220,000 ohms. The plates of the diodes 76, 78 and 80 are also connected to the grid of the tube 71. The cathode of the diode 76 is connected to an output terminal of a control member such as the left output terminal of a flip-flop 82.

As will be described in detail subsequently, the flip-flop 82 introduces a high voltage to the cathode of the diode 76 whenever a recording operation rather than a reading operation is to be performed. The flip-flop 82 and the other flip-flops are shown in block form in FIGURES 1 and 2 since their construction is well known in the art. Each flip-flop is provided with two output terminals which will hereafter be designated the left and right output terminals. Although the flip-flop 82 is provided with two output terminals, only one output terminal designated as the left output terminal of the flip-flop has to be used in the embodiment constituting this invention.

A connection is made from the cathode of the diode 78 to the plates of diodes 86 and 88 which constitute a gate 85 and to one terminal of a resistance 90 having its other terminal connected to the source 73 to receive +150 volts. The cathodes of the diodes 86 and 88 are respectively connected to the output terminals of control members such as flip-flops 92 and 94. The cathodes of the diodes 86 and 88 are shown as being connected to the left output terminals of the flip-flops 92 and 94.

The plates of the diodes 86 and 88 are connected to the cathode of a diode 102 as well as to the cathode of the diode 78. The diode 102 is included in a logical network including a gate 101 (see also FIG. 1) which also includes diodes 104 and 106. The cathode of the diode 104 receives voltages from the same output terminal of the flip-flop 82 as does the cathode of the diode 76. The cathode of the diode 106 has voltages applied to it from a first output terminal of a control member such as a flip-flop 108. The voltage on the second output terminal of the flip-flop 108 is applied to the cathode of the diode 80. The cathodes of the diodes 80 and 106 are shown as being respectively connected to the left and right output terminals of the flip-flop 108.

The plates of the diodes 102, 104 and 106 have a common terminal with a resistance 112 which is provided with a suitable value such as approximately 220,000 ohms. The resistance 112 is adapted to receive a suitable voltage such as approximately 150 volts from the source 73. The plates of the diodes 102, 104 and 106 also have a common terminal with the grid of a tube 114 which may be included in the same envelope as the tube 71. The cathode of the tube 114 is connected to the cathode of the tube 71 and to one terminal of a resistance 116 having a suitable value such as approximately 43 ohms. The other terminal of the resistance 116 is connected in a circuit including a manually operated switch 118. The movable contact of the switch 118 is connected to the resistance 116 and the stationary contact of the switch is grounded. The operation of the circuit including the switch 118 will be described in detail subsequently.

Connections are made to opposite terminals of a resistance 120 from the plates of the tubes 71 and 114. The resistance 120 is provided with a suitable value such as approximately 10,000 ohms. Connections are also respectively made from the plates of the tubes 71 and 114 to the terminals 60 and 61, as previously described. It has also been previously described that the terminals 60 and 61 are included in a circuit with the head 10. The center tap of the head 10 is connected to the cathode of a tube 122 which may be included in an envelope designated as a type "5687". The cathode of the tube 122 is also connected to first terminals of a resistance 124 and a capacitance 126, second terminals of the resistance and capacitance being grounded. The resistance 124 may be provided with a suitable value such as approximately 100,000 ohms and the capacitance 126 may be provided with a suitable value such as approximately .001 microfarad.

The plate of the tube 122 is adapted to receive a suitable positive voltage such as approximately +300 volts from the source 73. The grid of the tube 122 is clamped to a maximum value such as approximately +150 volts by a connection to the plate of a diode 128 and by connecting the cathode of the diode to receive +150 volts from the source 73. The grid of the tube 122 is also connected to the plate of a tube 130, which may be included in the same envelope as the tube 122. A resistance 132 having a suitable value such as approximately 91,000 ohms is connected between the source 73 and the plate of the tube 130 to apply a positive potential such as +300 volts through the resistance to the plate of the tube.

A connection is made from the cathode of the tube 130 to one terminal of a resistance 136 having its other terminal grounded. The resistance 136 may be provided with a suitable value such as approximately 2000 ohms. A suitable negative voltage such as approximately −160 volts is applied from the source 73 to the grid of the tube 130 through a resistance 138 having a suitable value such as approximately 390,000 ohms. The grid of the tube 130 is also connected to the cathodes of a pair of diodes 140 and 142 which are included in a logical network designated in the art as an "or" network, and which constitute a gate 141. The plates of the diodes 140 and 142 are respectively connected to output terminals of a pair of control members such as flip-flops 144 and 146. The plates of the diodes 140 and 142 are shown in FIGURE 2 as being connected to the left output terminals of the flip-flops 144 and 146.

As will be described in detail subsequently, the flip-flops 144 and 146 and the diodes 140 and 142 control the introduction of an energizing signal to the line 68 in FIGURE 1. The flip-flops 144 and 146 and networks similar to that formed by the diodes 140 and 142 also control the introduction of energizing signals to the lines 69, 70 and 71. For example, a gate 143 corresponding to that including the diodes 140 and 142, the resistance 138 and the tubes 130 and 122 receives voltage from the right output terminals of the flip-flops 144 and 146 and applies its output signals to the line 69 through stages including tubes corresponding to the tubes 130 and 122 in FIGURE 2. Similarly, a gate 145 in FIGURE 1 has voltages applied to it from the left output terminal of the flip-flop 144 and the right output terminal of the flip-flop 146. Connections are made to input terminals of a gate 147 from the right output terminal of the flip-flop 144 and the left output terminal of the flip-flop 146. The gates 145 and 147 respectively operate to control the introduction of signals to the lines 70 and 71. The signals are introduced to the lines 70 and 71 from the gates 145 and 147 through stages including the tubes 130 and 122 in FIGURE 2.

Since each of the flip-flops 92 and 94 is also provided with two output terminals, a plurality of logical networks can also be connected to the output terminals of these flip-flops in different patterns. For example, the operation of a gate 148 is controlled by signals from the left output terminal of the flip-flop 92 and the right output terminal of the flip-flop 94. Connections are made from the gate 148 directly to input terminals of gates 149 and 150 corresponding to the gates formed by the diodes 76, 78 and 80 and by the diodes 102, 104 and 106. The connections from the gate 148 to the gates 149 and 150 may be made from the plates of the diodes in the gate 148 to the cathodes of individual diodes in the gates 149 and 150.

Other input terminals of the gate 149 have signals applied to them directly from the left output terminals of the flip-flops 82 and 108. Other input terminals of the gate 150 receive signals directly from the left output terminal of the flip-flop 82 and the right output terminal of the flip-flop 108. The signals from the gates 149 and 150 respectively pass to the terminals 62 and 63 through stages which include tubes corresponding to the tubes 70 and 114 in FIGURE 2.

Similarly, a gate 151 in FIGURE 1 receives the voltages from the left output terminal of the flip-flop 94 and the right output terminal of the flip-flop 92 and applies any signal passing through it to gates 152 and 153 corresponding to the gates 149 and 150. The signals are applied from the plates of the diodes in the gate 151 to the cathodes of individual diodes in the gates 152 and 153. Connections are made to other input terminals of the gate 152 from the left output terminals of the flip-flops 82 and 108 and to other input terminals of the gate circuit 153 from the left output terminal of the flip-flop 82 and the right output terminal of the flip-flop 108. The signals from the gates 152 and 153 are respectively applied to the terminals 64 and 65 through stages which include tubes corresponding to the tubes 70 and 114 in FIGURE 2.

A gate 154 in FIGURE 1 has voltages applied to it from the right output terminals of the flip-flops 92 and 94 so as to control the introduction of energizing signals to gates 155 and 156. The signals pass directly from the plates of the diodes in the gate 154 to the cathodes of individual diodes in the gates 155 and 156. The gate 155 has other input terminals connected to the left output terminals of the flip-flops 82 and 108 and the gate 156 has other input terminals connected to the left output terminal of the flip-flop 82 and the right output terminal of the flip-flop 108. The output signals from the gates 149 and 150 respectively pass to the terminals 66 and 67 through stages which include tubes corresponding to the tubes 70 and 114 in FIGURE 2.

In addition to the connections described above, the terminals 60 and 61 are respectively connected to first terminals of resistances 157 and 158 (FIGURE 2), the second terminals of which are grounded. Each of the resistances 157 and 158 may be provided with a suitable value such as approximately 75,000 ohms. The terminals 60 and 61 are also connected to the cathodes of diodes 160 and 162, which may be a type "1N68." As will be described in detail subsequently, the diodes 160 and 162 and the components associated with the diodes effectively serve as coupling circuits to provide for a passage of signals from the head 10 only at particular times. The plates of the diodes 160 and 162 respectively have connections with the grids of tubes 164 and 165. The tubes 164 and 165 may be included within a single envelope designated as a type "5965."

Thet grids of the tubes 164 and 165 are respectively connected to first terminals of resistances 166 and 167, each of which has a suitable value such as approximately 180,000 ohms. The second terminals of the resistances 166 and 167 have common connections with the plate of a tube 168 which may be included in an envelope designated as a type "5965." The plate of the tube 168 is adapted to receive a positive potential through a resistance 169 from the terminal of the source 73 for supplying +300 volts. The plate of the tube 168 is also connected to one terminal of a capacitance 170 having its other terminal grounded. The grid of the tube 168 has a potential applied to it through a resistance 171 from the left output terminal of the flip-flop 82. One terminal of a resistance 172 is connected to the cathode of the tube 168 and the other terminal of the resistance is grounded. The resistances 169, 171 and 172 and the capacitance 170 are provided with suitable values such as approximately 22,000 ohms, 220 ohms, 47 ohms and 0.0033 microfarad, respectively. Suitable voltages such as +300 volts are applied from the source 73 to the plates of the tubes 164 and 165. The cathodes of the tubes 164 and 165 are connected to a series branch formed by a resistance 174, a potentiometer 176 and a resistance 178. Each of the resistances 174 and 178 may have a suitable value such as approximately 1,000 ohms and the potentiometer 176 may have a suitable value such as approximately 2000 ohms. A suitable potential such as approximately +150 volts is applied to the movable contact of the potentiometer 176 from the source 73.

A primary winding 180 of a transformer generally indicated at 182 is connected between the cathodes of the tubes 164 and 165. The transformer 182 has two secondary windings 184 and 186 which are preferably wound on an interleaved basis so as to have substantially identical characteristics. The second terminal of the winding 184 and the first terminal of the winding 186 are connected to the plate of a diode 188, the cathode of which is grounded. The diode 188 may be a type "1N67A." The second terminal of the winding 184 and the first terminal of the winding 186 are also connected to first terminals of resistances 190 and 192 having siutable values such as approximately 150,000 ohms and 15,000 ohms respectively. The second terminal of the resistance 190 is adapted to receive a suitable voltage such as approximately +150 volts from the source 73. The second terminal of the resistance 192 is connected to the plates of the diodes 86 and 88.

A resistance 196 having a suitable value such as approximately 5100 ohms is connected between the first terminal of the winding 184 and the second terminal of the winding 186. Opposite terminals of the resistances 196 are also connected to the plates of diodes 198 and 200, each of which may be a type "1N67A." Connections are made from the cathodes of the diodes 198 and 200 to the grids of tubes 202 and 204, which may be included within a single envelope designated as a type "5965."

The cathodes of the diodes 198 and 200 respectively have common connections with first terminals of resistances 206 and 208, each of which has a suitable value such as approximately 1 megohm. The second terminals of the resistances 206 and 208 are biased from the source 73 to a suitable negative voltage such as approximately −150 volts. The second terminals of the resistances 206 and 208 are also connected to one terminal of a resistance 210 having a suitable value such as approximately 24,000 ohms. The other terminal of the resistance 210 has a common connection with the cathodes of the tubes 202 and 204.

The plates of the tubes 202 and 204 are respectively connected to first terminals of resistances 212 and 214, each of which has a suitable value such as approximately 820 ohms. The second terminals of the resistances 212 and 214 have a common connection with one terminal of a capacitance 216, the other terminal of which is grounded. The capacitance 216 may be provided with a suitable value such as approximately 20 microfarads. The second terminals of the resistances 212 and 214 are also connected to one terminal of a resistance 218 having a suitable value such as approximately 2,000 ohms. The other terminal of the resistance 218 is adapted to receive a suitable voltage such as +300 volts from the source 73.

The voltage on the common terminal between the capacitance 216 and the resistance 218 is also applied to the plate of a tube 220 which may be included in the same envelope as the tube 168. The grid of the tube 220 is adapted to receive alternating signals through a suitable coupling capacitance 222 from the plate of the tube 202. The grid of the tube 220 is positively biased through resistances 224 and 226 which are in series between the grid of the tube and ground. The resistance 226 is also in series with a resistance 228 between the cathode of the tube 220 and ground. The voltage developed across the resistances 226 and 228 may be applied to an amplifier 230, which is shown in block form since its construction is well known. The resistances 224, 226 and 228 may respectively have values of approximately 47,000 ohms, 3600 ohms and 390 ohms.

As previously described, the construction and operation of flip-flops such as the flip-flops 142 and 144 are well known to persons skilled in the art. Each flip-flop is provided with two cross-coupled stages which may be designated as the left stage and the right stage. The left stage is provided with an input terminal which may be designated as the left input terminal. The left stage is also provided with an output terminal which may be designated as the left output terminal. Similarly, the right stage may be provided with input and output terminals which may be respectively designated as the right input and right output terminals.

The left and right stages are inter-connected so that one stage is conductive at any one time and the other stage is non-conductive at that time. The conductive stage has a relative low voltage on its output terminal since the output terminal may be the plate of a vacuum tube. The non-conductive stage has a relatively high voltage on its output terminal.

At certain times, the left stage of a flip-flop may be conductive and the right stage of the flip-flop may be cut off. At such times, the flip-flop may be considered to be in the "false" state of operation. This state of operation may be represented by a relatively high voltage on the right output terminal of the flip-flop and a relatively low voltage on the left output terminal of the flip-flop.

Subsequently, a triggering signal may be introduced to the left input terminal of the flip-flop to cut off the left stage and make the right stage conductive. This may be designated as the "true" state of operation of the flip-flop and is indicated by a relatively high voltage on the left output terminal of the flip-flop and a relatively low voltage on the right output terminal of the flip-flop. When the flip-flop is in the "true" state, the introduction of a triggering signal to the right input terminal of the flip-flop causes the flip-flop to be triggered into the false state of operation.

As previously described, the flip-flops 144 and 146 are capable of operating in different patterns at different instants of time. For example, relatively high voltages may be produced simultaneously on the left output terminals of the flip-flops 144 and 146 at one instant. At the next instant, a relatively high voltage may be produced on the left output terminal of the flip-flop 144 at the same time that a relatively high voltage is produced on the right output terminal of the flip-flop 146. The gating circuits 143, 145 and 147 and the gating circuit 141 formed by the diodes 140 and 142 and the resistance 138 are activated at different instants in accordance with the particular patterns of operation of the flip-flops 144 and 146.

Relatively low voltages are produced on the left output terminals of the flip-flops 144 and 146 and upon the simultaneous triggering of the flip-flops 144 and 146 to the false states of operation. These low voltages are introduced to the plates of the diodes 140 and 142. Because of the simultaneous introduction of relatively low voltages to the plates of the diodes 140 and 142, a relatively low voltage is produced on the cathodes of the diodes. This voltage has a negative polarity because of the introduction of a negative potential through the resistance 138 to the cathodes of the diodes. The negative potential produced on the cathodes of the diodes 140 and 142 is introduced to the grid of the tube 130 to cut off any flow of current through the tube.

When the tube 130 becomes cut off, the voltage on the plate of the tube would normally approach the positive potential applied from the source 73 to the resistance 132 since no voltage drop can be produced across the resistance. However the diode 128 acts to clamp the potential on the plate of the tube 130 at approximately +150 volts since the cathode of the diode receives +150 volts from the source 73. This potential of +150 volts is introduced to the grid of the tube 122 to produce a flow of current through a circuit including the source 73, the tube 122 and the parallel combination of the resistance 124 and the capacitance 126. The resultant flow of current through the resistance 124 and the capacitance 126 causes a voltage approaching the potential on the grid of the tube 122 to be produced on the cathode of the tube. This relatively high potential is introduced through the line 68 to the center taps of the heads 10, 18, 26 and 34 in FIGURE 1.

Relatively low voltages are introduced to the lines 69, 70 and 71 at the same time that a relatively high potential is introduced to the line 68. A relatively low potential is introduced to the lines 69, 70 and 71 because of the operation of the flip-flops 144 and 146 in introducing at least one relatively high voltage to each of the gates 143, 145 and 147. This high voltage produces a flow of current through at least one of the diodes in each of the gates 143, 145 and 147. This flow of current would be equivalent to a flow of current through one of the diodes 140 and 142 in the gate shown in FIGURE 2 and would produce a positive voltage with respect to ground on the cathodes of the diodes.

The positive potential produced on the cathodes of the diodes in the gates 143, 145 and 147 is introduced to the grid of a tube in each of the gates corresponding to the grid of the tube 130 in FIGURE 2. This potential produces a flow of current through the tube in each of the gates 143, 145 and 147 corresponding to the tube 130 such that a voltage drop is produced across the resistance corresponding to the resistance 132 in FIGURE 2. This voltage drop is sufficient to cut off the tube in each of the gates 143, 145 and 147 corresponding to the tube 122 in FIGURE 2 so that no potential can be produced across the resistance corresponding to the resistance 124. In this way, a relatively low voltage is introduced to each of the lines 69, 70 and 71 at the same time that a relatively high voltage is introduced to the line 68.

In like manner, the flip-flops 92 and 94 control whether the terminals 60 and 61, the terminals 62 and 63, the terminals 64 and 65 or the terminals 66 and 67 are selected at any instant. When relatively high voltages are simultaneously produced on the left output terminals of the flip-flops 92 and 94, relatively high voltages are introduced at the same time to the cathodes of the diodes 86 and 88. These high voltages operate to limit any flow of current through a circuit including the source 73, the resistance 90, the diodes 86 and 88 and the flip-flops 92 and 94. A resultant potential of high value is introduced to the cathode of the diode 78. This voltage prepares for activation the "and" network formed in part by the diodes 76, 78 and 80. The "and" network including the diodes 76, 78 and 80 is able to become activated only at the time that a relative high voltage is introduced to the cathode of the diode 76 from the left output terminal of the flip-flop 82 to indicate that the recording of signal information in the storage member 53 is to be performed. The "and" network is further able to become activated only when a relatively high voltage is introduced to the cathode of the diode 80 from the left output terminal of the flip-flop 108 to show that a binary indication of "1" is to be recorded.

When relatively high voltages are simultaneously introduced to the cathodes of the diodes 76, 78 and 80, these high potentials prevent current from flowing through a circuit including the source 73, the resistance 74 and the diodes. Since no voltage drop is produced across the resistance 74, a relatively high potential approaching +150 volts is produced on the plates of the diodes 76, 78 and 80 and is introduced to the grid of the tube 71. This potential produces a flow of current through a circuit including the terminal 60, the tube 71, the resistance 72 and through other members which will be described in detail subsequently.

Because of the flow of current through the terminal 60, this terminal tends to become selected. As will be seen, the terminal 60 is connected through the diodes 42, 46, 50 and 54 to the windings 10, 12, 14 and 16. However, the current is able to flow only through the winding 10 because of the production of a relatively high voltage on the line 68 and the simultaneous production of relatively low voltages on the lines 69, 70 and 71. The production of such voltages on the lines 68, 69, 70 and 71 has been set forth in detail. For this reason, current flows through a circuit including the line 68, the left half of the head 10 in FIGURES 1 and 2, the diode 42, the terminal 60, the tube 70 and the resistance 72. The flow of current toward the left in FIGURES 1 and 2 through the left half of the head 10 causes an indication of "1" to be recorded by the head 10 in the storage member such as the drum 11.

It may sometimes happen that relatively high voltages are produced on the left output terminals of the flip-flops 92 and 94 to indicate that either the terminal 60 or the terminal 61 is to become energized. A relatively high voltage may be simultaneously produced on the left output terminal of flip-flop 82 to indicate that a recording operation is to be performed. At the same time, a relatively high voltage may be produced on the right output terminal of the flip-flop 108 to show that a binary indication of "0" is to be recorded in the magnetic drum 11. Upon the simultaneous occurrence of such voltages, relatively high voltages are introduced to the cathodes of the diodes 102, 104 and 106 to activate the "and" network including these diodes.

When the "and" network formed by the diodes 102, 104 and 106 becomes activated, a relatively high voltage is produced on the plates of the diodes since current is unable to flow through the resistance 112. This voltage is introduced to the grid of the tube 114 in FIGURE 2 to produce a flow of current through a circuit including the line 68, the right half of the head 10 in FIGURES 1 and 2, the diode 44, the terminal 61, the tube 114 and the resistance 116. When current flows through the right half of the head 10 in a direction toward the right in FIGURES 1 and 2, an indication of "0" is recorded by the head in the storage member such as the drum 11.

As previously described, a relatively high voltage is produced on the left output terminal of the flip-flop 82 to indicate that information is to be recorded on the periphery of the drum 11. This high voltage is introduced to the grid of the tube 168 to produce a flow of current through a circuit including the voltage source 73, the resistance 169, the tube 168 and the resistance 172. This current produces a voltage drop across the resistance 169 such that a relatively low voltage is produced on the plate of the tube 168. The low voltage on the plate of the tube 168 is introduced through the resistance 166 to the plate of the diode 160 and through the resistance 167 to the plate of the diode 162. This voltage is sufficiently low relative to the voltages introduced to the cathodes of the diodes 160 and 162 so as to bias the diodes against the passage of signals from the head 10 through the diodes. In this way, the signals introduced to the head 10 for recording on the periphery of the drum 11 cannot pass through the diodes 160 and 162 so as to activate the reading circuits associated with the head 10.

During the times that it is desired to obtain a recording operation, the switch 118 is closed. This causes a relatively large current to flow through members including the head 10, one of the tubes 71 and 114, the resistance 116 and the switch 118. A large current flows through this circuit because of the low value provided for the resistance 116. Since current having a large amplitude flows through the head 10, a sufficient flux is produced by the head to obtain the recording of magnetic information in the drum 11.

At particular times, it may be desired to prevent signals from being recorded even though a recording operation may be specified by a high voltage on the left output terminal of the flip-flop 82. This may be accomplished by opening the switch 118. During such times, current flows through a circuit including the head 10, one of the tubes 70 and 114 and the resistance 72. Since the resistance 72 has a relatively high value, the current flowing through the head 10 has a relatively low amplitude. This amplitude is too low to produce a sufficient amount of flux for recording a magnetic signal in the drum 11.

It may sometimes be desired to read the magnetic information in the drum 11 rather than to record information in the drum. At such times, a relatively high voltage is produced on the right output terminal of the flip-flop 82 to indicate that the magnetic information in the drum 11 is to be read. This causes a relatively low voltage to be produced on the left output terminal of the flip-flop 82 and to be introduced to the cathodes of the diodes 76 and 104 in FIGURE 2. This low voltage prevents the "and" networks formed in part by the diodes 76, 78 and 80 and in part by the diodes 102, 104 and 106 from being activated. By preventing these "and" networks from being activated, current is unable to flow through the tubes 71 and 114.

A particular one of the "and" networks corresponding to that formed by the diodes 86 and 88 becomes activated at any instant. For example, the "and" network formed by the diodes 86 and 88 may actually become activated at a particular instant in a manner similar to that described above. When the "and" network formed by the diodes 86 and 88 becomes activated, a relatively high voltage is introduced from the plates of the diodes 86 and 88 through the resistance 192 to the plate of the diode 188. At such times, the voltage on the plate of the diode 188 is clamped at ground because of the flow of current through the diode. This voltage is introduced to the common terminal between the windings 184 and 186 to render the diodes 198 and 200 conductive. The ground potential produced at the common terminal between the windings 184 and 186 is at a higher level than the potentials produced at the corresponding terminals of the transformers associated with the other heads in other vertical columns since these terminals have a negative potential with respect to ground.

The relatively low voltage produced on the left output terminal of the flip-flop 82 to indicate the reading of signals is introduced to the grid of the tube 168. This voltage is sufficiently low to cut off the tube 168. Because of the resultant interruption in the flow of current through the resistance 169, the potential on the plate of the tube approaches a value of +300 volts. This voltage is introduced to the grids of the tubes 164 and 165 to make the tubes conductive. The high voltages on the grids of the tubes 164 and 165 are also introduced to the plates of the diodes 160 and 162. Because of the high voltage on the plates of the diodes 160 and 162, any signals introduced to the cathodes of the diodes are able to pass through the diodes. These signals then pass to the grids of the tubes 164 and 165 to control at any instant the flow of current through the tubes.

The selection of horizontal rows of heads in FIGURE 1 during the reading operation occurs in a manner similar to that described previously for the recording operation. For example, a signal is introduced to the tube 130 to interrupt any flow of current through the tube when relatively low voltages are simultaneously produced on the left output terminals of the flip-flops 144 and 146. The resultant high voltage on the plate of the tube 130 is operative to produce a flow of current through the tube 122. This current causes a relatively high voltage to be produced on the cathode of the tube 122 for introduction to the center tap of the head 10. The high voltage on the center tap of the head 10 is then introduced through the head and the diodes 42 and 44 to the cathodes of the diodes 160 and 162 and to the cathodes of the diodes associated with the other heads in the same horizontal row as the head 10.

The high voltage introduced to the cathodes of the various diodes including the diodes 160 and 162 biases all of the heads except the head 10 in the horizontal row against the passage of any signals. This results from the fact that the voltages on the cathodes of the diodes other than the diodes 160 and 162 are higher than the voltages on the plates of these diodes. However, as described in the previous paragraphs, relatively high voltages are also introduced at the same time only to the plates of the diodes corresponding to the diodes 198 and 200 in the vertical column of heads including the head 10. Since the voltages on the plates of the diodes 160 and 162 are greater than the voltages introduced to the cathodes of the diodes, signals are able to pass from the head 10 through the diodes.

By way of example, the magnetic information in the drum 11 may cause a positive signal to be induced in the left half of the head in FIGURES 1 and 2. Since the head 10 is center-tapped, a negative signal is induced in the right half of the head in FIGURES 1 and 2 at the same time that a positive signal is induced in the left half of the head. These signals are respectively indicated at 250 and 252 in FIGURE 2. The signals 250 and 252 respectively pass through the diodes 160 and 162 as described in the previous paragraph. The signals 250 and 252 are then respectively introduced to the grids of the tubes 164 and 165.

The positive signal introduced to the grid of the tube 164 produces an increased flow of current through a circuit including the voltage source 73, the tube 164, the resistance 174 and the potentiometer 176. This increased flow of current causes an increased voltage to be produced across the resistance 174 such that a positive signal 254 is produced on the cathode of the tube 164. In like manner, the negative signal 252 produces a decreased flow of current through a circuit including the source 73, the tube 165, the resistance 178 and the potentiometer 176. This decreased flow of current causes a decreased voltage drop to be produced across the resistance 178 and a negative signal 256 to be produced on the cathode of the tube 165.

The signals 254 and 256 are introduced to opposite terminals of the primary winding 180 to produce a flow of magnetizing current through the winding. This magnetizing current causes signals to be induced in the windings 184 and 186. As indicated at 258, the induced signals have a positive amplitude at the left terminal of the winding 184 in FIGURE 2. The induced signals have a negative amplitude at the right terminal of the winding 186, as indicated at 260 in FIGURE 2.

As previously described, only the windings 184 and 186 have a ground potential at their common terminal. The corresponding windings associated with the other heads have a negative potential at this time since a relatively high voltage is not able to be introduced to the windings through the gates such as the gates 148, 151 and 154. The ground potential at the common terminal between the windings 184 and 186 provides on the plates of the diodes 198 and 200 a direct bias which is positive with respect to the direct bias on corresponding diodes associated with the other heads. This positive bias on the plates of the diodes 198 and 200 relative to the bias on corresponding diodes associated with the other heads allows the signals 258 and 260 to pass through the diodes to the grids of the tubes 202 and 204. The increased bias of positive polarity on the plates of the diodes 198 and 200 is sufficient to allow negative signals such as the signal 260 to pass through the diodes.

The negative signal 260 operates to produce a decreased flow of current through a circuit including the voltage source 73, the resistance 218, the resistance 214, the tube 204 and the resistance 210. This decreased flow of current produces a decreased voltage across the resistance 210 and a decreased voltage on the cathodes of the tubes 202 and 204. Because of the decreased voltage on the cathode of the tube 202, an increased flow of current is obtained through the tube when the positive signal 258 is introduced to the grid of the tube. This increased current flows through a circuit including the voltage source 73, the resistance 218, the resistance 212, the tube 202 and the resistance 210.

The increased current flowing through the resistance 212 and the tube 202 produces an increased voltage drop across the resistance 212 and a decreased voltage on the plate of the tube 202. This decreased voltage is indicated in signal form at 262 in FIGURE 2. The signal 262 is introduced through the coupling capacitance 222 to the grid of the tube 220 to produce a decreased flow of current through a circuit including the voltage source 73, the resistance 218, the tube 220 and the resistances 228 and 226. This causes a negative signal 264 to be produced on the cathode of the tube 220 and to be introduced to the successive amplifier stages 230.

It may sometimes happen that a positive signal is introduced to the grid of the tube 204 at the same time that a negative signal is introduced to the grid of the tube 202. The positive signal is instrumental in producing an increased flow of current through the tube 204 and the resistance 210 so that a positive signal is produced on the cathodes of the tubes 202 and 204 at the same time that the negative signal is introduced to the grid of the tube 202. The positive signal on the cathode of the tube operates in conjunction with the negative signal on the grid of the tube to limit the flow of current through the resistance 212 and the tube 202 so that a positive signal is produced on the plate of the tube. This positive signal in turn causes a positive signal to be produced on the cathode of the tube 220 for introduction to the successive amplifier stages 230.

It will be seen from the previous paragraphs that the tubes 202 and 204 and their associated components operate as a differential amplifier to introduce to the amplifier 230 signals corresponding to the difference in the signals introduced to the grids of the tubes 202 and 204. No signals are produced in the amplifier 230 when signals of the same polarity and amplitude are introduced to the grids of the tubes 202 and 204. For example, a positive signal introduced to the grid of the tube 204 may produce an increased voltage on the cathodes of the tubes 202 and 204 in a manner similar to that described above. This signal has an amplitude and a polarity corresponding to the positive signal introduced to the grid of the tube 202. Since corresponding signals are introduced to the grid and cathode of the tube 202, no change is produced in the current flow through the tube. In this way, no signal is produced on the plate of the tube for introduction to the grid of the tube 220 and no signal is introduced to the amplifier 230. Because of this, random signals such as noise signals tend to be suppressed.

It will be seen from the discussions in the previous paragraphs that random signals such as noise signals induced in the head 10 tend to be suppressed by the operation of the differential amplifier including the tubes 202 and 204. The noise signals also tend to be suppressed because of the inclusion of the push-pull stages, such as the stages including the tubes 164 and 165. Noise signals can be further suppressed by pairing corresponding wires on each side of the push-pull stages so that equal effects resulting from current leakages and capacitive tendencies are produced. Noise signals also tend to be suppressed by providing a low impedance for the cathode follower stage including the tube 220 and a low impedance for the amplifier 230.

As described previously, the balanced construction and operation of the recording stages are instrumental in producing accurate output signals in the amplifier stages 230. The accuracy in the output signals is further enhanced by the inclusion of the potentiometer 176. This results from the fact that the position of the movable contact in the potentiometer 176 can be adjusted to compensate for differences in the characteristics of the tubes 164 and 165 and in the resistances and other components associated with these tubes. In this way, the signals introduced to the grids of the tubes 202 and 204 tend to reflect accurately the signals induced in the head 10.

Increased accuracies in the reading and writing operations are also obtained by the inclusion of the resistance 124 and the capacitance 126. By providing an optimum value for the capacitance 126, the capacitance becomes charged quickly by a flow of current through a circuit including the tube 122 and the capacitance. Because of the fast charging of the capacitance 126, the head 10 is activated quickly for optimum operation so that signals can be quickly read or recorded. When the tube 122 becomes cut off, the capacitance starts to discharge slowly through the resistance 124 since the resistance has a relatively high value. Because of the slow discharge of the capacitance 126, the capacitance does not have to be charged very much in case it is desired to activate the head instantaneously after the first activation. As a result, only a signal having a relatively low amplitude is produced by a subsequent charging of the capacitance. This signal has a sufficiently small amplitude to prevent any material unbalance from being produced in the reading stages such as the stages including the tubes 164 and 165. As a result, the stages including the tubes 164 and 165 can operate effectively on a push-pull basis in suppressing the signal. The capacitance 170 is also instrumental in providing an accurate operation during the recording operation. The capacitance 170 is provided with a value to produce a relatively slow rise in potential on the plate of the tube 168 when current flows through a circuit including the voltage source 73, the resistance 169 and the capacitance 170 to charge the capacitance. This relatively slow rise in potential prevents the tubes 164 and 165 from being triggered instantaneously into full conductivity. Because of this slow rise in potential, the transient signals induced in the transformer 182 have a relatively low amplitude. This is desirable since the differences in the characteristics of the diodes and resistors on opposite sides of push-pull stages might be instrumental in producing spurious output signals if transient signals of high amplitude were induced in the transformer 182.

As will be seen, the amplifier 230 may produce signals in representation of the signals read by any of the transducers. For this reason, only the amplifier 230 is required and not a separate amplifier for each transducer. In like manner, only the difference amplifier formed in part by the tubes 202 and 204 is required. This amplifier can be coupled to the push-pull amplifier associated with each transducer by a separate pair of diodes corresponding to the diodes 198 and 200 in FIGURE 2. Furthermore, only the stage formed in part by the tube 168 and the resistances 169, 171 and 172 is required. The reason is that the plate of the tube 168 can be connected to each push-pull amplifier stage at terminals corresponding to the resistances 166 and 167 in the stage shown in FIGURE 2.

I claim:

1. In combination for use with a storage medium for storing a plurality of bits of information, a plurality of transducers adapted to be disposed in coupled relationship with the storage medium for recording bits of information on the storage medium in response to applied input signals and for reading bits of information recorded on the storage medium, each of said transducers including a winding having a pair of terminals and an intermediate tap and producing a pair of oppositely poled signals at respective ones of the terminals constituting said pair in response to the reading thereby of the bits of information on the storage medium; first circuit means for connecting said transducers into a matrix composed of a plurality of different rows and columns of said transducers; first logic circuitry coupled to respective ones of the intermediate taps on the transducer windings for selectively conditioning different ones of the rows of said transducers for recording and reading operations; second logic circuitry coupled to respective ones of the pairs of terminals of the transducer windings for selectively conditioning different ones of the columns of transducers for recording and reading operations; input circuit means coupled to said first circuit means for introducing to the matrix of said transducers input signals corresponding to information to be recorded in the storage medium, such information being recorded at any particular time by the one of said plurality of transducers common to the one of said rows conditioned by said first logic circuitry and to the one of said columns conditioned by said second logic circuitry at that time; a plurality of push-pull circuits respectively coupled to the pairs of terminals of the transducer windings in respective ones of said columns for passing the corresponding pairs of oppositely-poled signals produced thereby, each of said push-pull circuits including a pair of discharge devices, each of said discharge devices including a cathode, a control grid and an anode; control means coupled to said input circuit means and to said push-pull circuits for alternately conditioning the matrix to a recording mode and to a reading mode, said control means being coupled to the control grids of said discharge devices to control the bias potential applied thereto, and said control means serving to activate said input circuit means and to deactivate said push-pull circuits for the recording mode and serving to activate said push-pull circuits and deactivate said input circuit means for the reading mode; a differential amplifier for amplifying the oppositely-poled signals passed by said push-pull circuits and for producing output signals in response thereto; a corresponding plurality of coupling networks coupling said push-pull circuits to said differential amplifier, each of said coupling networks including a transformer having a primary winding coupled to the cathodes of said pair of discharge devices in the corresponding push-pull circuit and a secondary winding coupled to said differential amplifier; means coupled to said differential amplifier for utilizing the output signals produced thereby; and further circuitry coupled to said second logic circuitry and to said coupling networks for causing the coupling networks associated with the different columns of transducers to be selectively conditioned to permit the signals passed at any particular time by the particular push-pull circuit coupled to the transducer common to the row selected by said first logic circuitry and to the column selected by said second logic circuitry at that particular time to be introduced to the differential amplifier, said further circuitry being coupled to an intermediate tap on the secondary winding of said transformer in each of said coupling networks.

2. In combination for use with a storage medium for storing a plurality of bits of information, a plurality of transducers adapted to be disposed in coupled relationship with the storage medium for recording bits of information on the storage medium in response to applied input signals and for reading bits of information recorded on the storage medium, each of said transducers producing a pair of oppositely-poled signals in response to the reading thereby of the bits of information on the storage medium; circuit means for connecting said transducers into a matrix composed of a plurality of rows and columns of said transducers; first logic circuitry coupled to said circuit means for selectively conditioning different ones of the rows of said transducers for recording and reading operations; second logic circuitry coupled to said circuit means for selectively conditioning different ones of the columns of said transducers for recording and reading operations; input circuit means coupled to said first mentioned circuit means for introducing to the matrix input signals corresponding to the information to be recorded on the storage means, such information being recorded at any particular time by the one of said plurality of transducers common to the one of said rows conditioned by said first logic circuitry and to the one of said columns conditioned by said second logic circuitry at that particular time; a plurality of push-pull circuits respectively coupled to said transducers for passing the pairs of oppositely-poled signals produced thereby, each of said push-pull circuits including a pair of discharge devices, and each of said discharge devices including a cathode, a control grid and an anode, each of said push-pull circuits further including a potentiometer connected to the cathodes of said discharge devices for controlling the relative amplitudes of the bias potentials applied thereto to compensate for differences in characteristics of said discharge devices and thereby balance the push-pull circuit; control means coupled to said push-pull circuits for de-activating the same during a recording operation by said input circuit means; and a differential amplifier coupled to said push-pull circuits for amplifying the opposite-poled signals passed by the particular one of said push-pull circuits coupled to the one of said plurality of transducers common to the one of said rows conditioned by said first logic circuitry and to the one of said columns conditioned by said second logic circuitry at that particular time.

3. In combination for use with a storage medium for storing a plurality of bits of information, a plurality of transducers adapted to be disposed in coupled relationship with the storage medium for recording bits of information on the storage medium in response to applied input signals and for reading bits of information recorded on the storage medium; each of said transducers including a winding having a pair of terminals and an intermediate tap for producing a pair of oppositely-poled signals at respective ones of the terminals constituting said pair in response to the reading thereby of the bits of information on the storage medium; first circuit means for connecting said transducers into a matrix composed of a plurality of different rows and columns of said transducers; first logic circuitry coupled to respective ones of the intermediate taps on the transducer windings for selectively conditioning different ones of the rows of said transducers for recording and reading operations; second logic circuitry coupled to respective ones of the pairs of terminals of the transducer windings for selectively conditioning different ones of the columns of transducers for recording and reading operations; input circuit means coupled to said first circuit means for introducing to the matrix of said transducers input signals corresponding to information to be recorded in the storage medium, such information being recorded at any particular time by the one of said plurality of transducers common to the one of said rows conditioned by said first logic circuitry and to the one of said columns conditioned by said second logic circuitry at that time; a plurality of push-pull circuits respectively coupled to the pairs of terminals of the transducer windings in respective ones of said columns for passing the corresponding pairs of oppositely-poled signals produced thereby, each of said push-pull circuits including a pair of electronic discharge devices, and each of said electronic discharge devices including an output electrode and a control electrode; control means coupled to said input circuit means and to said push-pull circuits for alternately conditioning the matrix to a recording mode and a reading mode, said control means being coupled to the control electrodes of said electronic discharge devices to control the bias potential applied thereto; said control means serving to activate said input circuit means and to deactivate said push-pull circuit for the recording mode and serving to activate said push-pull circuits and de-activate said input circuit means for the reading mode, a differential amplifier for amplifying the oppositely-poled signals passed by said push-pull circuits and for producing output signals in response thereto; a corresponding plurality of coupling networks coupling said push-pull circuits to said differential amplifier, each of said coupling networks including a transformer having a primary winding coupled to the output electrodes of said pair of electronic discharge devices and having a secondary winding coupled to said differential amplifier; means coupled to said differential amplifier for utilizing the output signals produced thereby; and further circuitry coupled to said second logic circuitry and to said coupling networks for causing the coupling networks associated with the different columns of transducers to be selectively conditioned to permit the signals passed at any particular time by the push-pull circuit coupled to the transducer common to the row selected by said first logic circuitry and to the column selected by said second logic circuitry at that particular time to be introduced to the differential amplifier, said further circuitry being coupled to an intermediate tap on the secondary winding of each of said coupling networks.

4. In combination for use with a storage medium for storing a plurality of bits of information, a plurality of transducers adapted to be disposed in coupled relationship with the storage medium for recording bits of information on the storage medium in response to applied input signals and for reading bits of information recorded on the storage medium, each of said transducers producing a pair of oppositely-poled signals in response to the readings thereby of the bits of information on the storage medium; circuit means for connecting said transducers into a matrix composed of a plurality of rows and columns of said transducers, first logic circuitry coupled to said circuit means for selectively, conditioning different ones of the rows of said transducers for recording and reading operations; second logic circuitry coupled to said circuit means for selectively conditioning different ones of the columns of said transducers for recording and reading operations; input circuit means coupled to said first mentioned circuit means for introducing to the matrix input signals corresponding to the information to be recorded on the storage means, such information being recorded at any particular time by the one of said plurality of transducers common to the one of said rows conditioned by said first logic circuitry and to the one of said columns conditioned by said second logic circuitry at that particular time; a plurality of push-pull circuits respectively coupled to said transducers for passing the pairs of oppositely-poled signals produced thereby; each of said push-pull circuits including a pair of electronic discharge devices, and each of said push-pull circuits further including a potentiometer connected to electrodes of said discharge devices for controlling the relative amplitudes of the bias potentials applied thereto to compensate for differences in characteristics of said electronic discharge devices and thereby balance the push-pull circuit, control means coupled to said push-pull circuits for de-activating the same during a recording operation by said input circuit means, and a differential amplifier coupled to said push-pull circuits for amplifying the oppositely-poled signals passed by the particular one of said push-pull circuits coupled to the one of said plurality of transducers common to the one of said rows conditioned by said first logic circuitry and to the one of said columns conditioned by said second logic circuitry at a particular time.

References Cited in the file of this patent

UNITED STATES PATENTS

| | | |
|---|---|---|
| 2,680,239 | Daniels | June 1, 1954 |
| 2,733,860 | Rajchman | Feb. 7, 1956 |
| 2,849,703 | Bindon et al. | Aug. 26, 1958 |
| 2,913,706 | Thorensen et al. | Nov. 17, 1959 |
| 2,927,304 | Paquin | Mar. 1, 1960 |
| 2,932,008 | Hoberg | Apr. 5, 1960 |

OTHER REFERENCES

I.R.E. Transactions, Electronic Computors, March 1955 (page 6 and FIG. 7 relied on).